US011224915B2

(12) United States Patent
Srinivasan et al.

(10) Patent No.: US 11,224,915 B2
(45) Date of Patent: Jan. 18, 2022

(54) METHOD OF REPAIRING A COMPONENT USING AN ADDITIVE MANUFACTURE REPLACEMENT COUPON, AND ALLOY FOR ADDITIVE MANUFACTURING

(71) Applicant: General Electric Company, Schenectady, NY (US)

(72) Inventors: Dheepa Srinivasan, Bangalore (IN); Joydeep Pal, Bangalore (IN); M. Raghunandan, Bangalore (IN); Rohit Sen, Bangalore (IN); Sridhar Balaram, Bangalore (IN); Mohamed Aleem, Bangalore (IN)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 15/970,101

(22) Filed: May 3, 2018

(65) Prior Publication Data

US 2018/0345381 A1    Dec. 6, 2018

(30) Foreign Application Priority Data

Jun. 5, 2017   (IN) .............................. 201741019726

(51) Int. Cl.
*B22F 7/06* (2006.01)
*B22F 5/04* (2006.01)
(Continued)

(52) U.S. Cl.
CPC ................ *B22F 7/062* (2013.01); *B22F 5/04* (2013.01); *B22F 7/02* (2013.01); *B22F 7/08* (2013.01);
(Continued)

(58) Field of Classification Search
CPC .... B22F 3/1055; B22F 2301/15; B22F 7/062; B22F 2007/068; B22F 7/08; B22F 5/009;
(Continued)

(56) References Cited

U.S. PATENT DOCUMENTS 4,668,290 A * 5/1987 Wang .................... A61L 27/045
75/235
5,462,575 A * 10/1995 Del Corso ............ A61L 27/045
75/243
(Continued)

FOREIGN PATENT DOCUMENTS

DE    102012013949 A1 * 1/2014 ............. F01D 5/005
EP       1 800 700 A2    6/2007
(Continued)

OTHER PUBLICATIONS

"EOS CobaltChrome Material Data Sheet", 2018 (Year: 2018).*
(Continued)

*Primary Examiner* — Alexandra M Moore
*Assistant Examiner* — Austin Pollock
(74) *Attorney, Agent, or Firm* — James Pemrick; Hoffman Warnick LLC (57) ABSTRACT

A method for forming a secondary component from an original component having an original shape includes separating the original component into a parent component and a replaced portion, and forming a replacement coupon using an additive manufacturing system. The replacement coupon is shaped to substantially match the original shape of the replaced portion. The method further includes coupling the replacement coupon to the parent component to form the secondary component. The method also includes at least one of (i) removing the replacement coupon from a build plate of the additive manufacturing system prior to application of any heat treatment to the as-built replacement coupon,
(Continued)

wherein the replacement coupon maintains a near-net original shape of the replaced portion after removal, and (ii) entering the secondary component into normal duty with no hot isostatic press treatment of the replacement coupon having been performed.

8 Claims, 5 Drawing Sheets

(51) Int. Cl.
| | |
|---|---|
| *B22F 7/02* | (2006.01) |
| *B33Y 80/00* | (2015.01) |
| *B33Y 10/00* | (2015.01) |
| *B33Y 70/00* | (2020.01) |
| *B33Y 40/00* | (2020.01) |
| *C22C 1/04* | (2006.01) |
| *F01D 5/28* | (2006.01) |
| *F01D 5/00* | (2006.01) |
| *B23P 6/00* | (2006.01) |
| *B22F 7/08* | (2006.01) |
| *B22F 10/20* | (2021.01) |
| *C22C 19/07* | (2006.01) |
| *B33Y 30/00* | (2015.01) |
| *B22F 10/30* | (2021.01) |

(52) U.S. Cl.
CPC .............. *B22F 10/20* (2021.01); *B23P 6/005* (2013.01); *B33Y 10/00* (2014.12); *B33Y 40/00* (2014.12); *B33Y 70/00* (2014.12); *B33Y 80/00* (2014.12); *C22C 1/0433* (2013.01); *C22C 19/07* (2013.01); *F01D 5/005* (2013.01); *F01D 5/28* (2013.01); *B22F 10/30* (2021.01); *B22F 2007/068* (2013.01); *B22F 2301/15* (2013.01); *B22F 2301/35* (2013.01); *B22F 2998/10* (2013.01); *B33Y 30/00* (2014.12); *F05D 2230/22* (2013.01); *F05D 2230/232* (2013.01); *F05D 2230/31* (2013.01); *F05D 2240/122* (2013.01); *F05D 2240/304* (2013.01); *F05D 2300/131* (2013.01); *F05D 2300/132* (2013.01); *F05D 2300/175* (2013.01)

(58) Field of Classification Search
CPC .......... B22F 10/10; B22F 10/20; B33Y 30/00; B33Y 40/00; B33Y 50/00; B33Y 50/02; B33Y 70/00; B33Y 80/00; B23K 26/342; B23K 35/0244; B23K 2103/26
See application file for complete search history.

(56) References Cited

U.S. PATENT DOCUMENTS

| | | | |
|---|---|---|---|
| 9,555,612 | B2 | 1/2017 | Kottilingam et al. |
| 2007/0084047 | A1* | 4/2007 | Lange ..................... B23P 6/005 29/889.1 |
| 2011/0036468 | A1* | 2/2011 | Zanon ..................... B22F 3/24 148/559 |
| 2011/0099810 | A1* | 5/2011 | Stankowski ............ B22F 7/062 29/888 |
| 2014/0034626 | A1 | 2/2014 | Illston |
| 2014/0163717 | A1 | 6/2014 | Das et al. |
| 2014/0259666 | A1* | 9/2014 | Baughman .............. B22F 7/062 29/889.1 |
| 2015/0273631 | A1* | 10/2015 | Kenney ................. B22F 3/1055 419/53 |
| 2015/0360288 | A1 | 12/2015 | Zalewski |
| 2019/0176273 | A1* | 6/2019 | Srinivasan ......... B23K 26/1476 |

FOREIGN PATENT DOCUMENTS

| | | | | |
|---|---|---|---|---|
| EP | 2 317 075 | A2 | 5/2011 | |
| EP | 2317075 | A2 * | 5/2011 | ............ F01D 5/005 |
| JP | 60177993 | A * | 9/1985 | ......... B23K 35/3046 |
| WO | WO-2014101772 | A1 * | 7/2014 | ............ C22C 30/00 |
| WO | 2016/071177 | A1 | 5/2016 | |
| WO | 2017/200401 | A1 | 11/2017 | |
| WO | WO-2017200401 | A1 * | 11/2017 | ............ B22F 3/1055 |
| WO | WO-2018220186 | A1 * | 12/2018 | ............ C22C 32/00 |

OTHER PUBLICATIONS

Jenney C., et al. ; "Welding Handbook—Welding Science and Technology", vol. 1, p. 351 (Year: 2001).*
ASM International; "Hot Corrosion in Gas Turbines", 2009, p. 249-258 (Year: 2009).*
Udroiu R.; "Additive Manufacturing Technologies Used for Superalloys Processing"; Technologia Inovativa, 2014 (Year: 2014).*
MatWeb; CoCrMo Composition search; "Sandvik Osprey Co212—Cobalt Alloy"; "3D Systems LaserForm CoCr"; and "Kennametal Stellite Stellite 21"; Retrieved Jun. 8, 2021 (Year: 2021).*
Sandvik; "Cobalt Alloy Metal Powder"; Retrieved Jun. 8, 2021; https://www.metalpowder.sandvik/en/products/metal-powder-alloys/cobalt-alloys/ (Year: 2021).*
Oksiuta, Z. and Dabrowski, J.R., "Rotary cold re-pressing and heat treatment of sintered materials from Co—Cr—Mo alloy powder", Power Metallurgy, Maney Publishing, vol. 45, Issue. 1, pp. 63-66 (Mar. 1, 2002).
Takashima, T., et al., Effect of Building Position on Phase Distribution in Co—Cr—Mo Alloy Additive Manufactured by Electron-Beam Melting, Materials Transactions, vol. 57, Issue. 12, pp. 2041-2047 (Oct. 14, 2016).
Extended European Search Report issued in connection with corresponding EP Application No. 18174594.4 dated Nov. 16, 2018.
"EOS CobaltChrome MP1," Material Data Sheet, EOS GmbH—Electro Optical Systems, Retrieved from the Internet URL: http://ip-saas-eos-cms.s3.amazonaws.com/public/4b839242298b3d77/721463526ca053889c9784ec989f3c88/EOS_CobaltChrome_MP1_en.pdf on Sep. 4, 2018, pp. 1-6 (Oct. 2011).
Tian, C., et al., "Effects of stacking fault energy on the creep behaviors of Ni-base superalloy," Materials and Design vol. 64, pp. 316-323 (2014).
Intention to Grant dated Apr. 28, 2021 for EP Application No. 18174594.4 filed May 28, 2018; pp. 88.

* cited by examiner

METHOD OF REPAIRING A COMPONENT USING AN ADDITIVE MANUFACTURE REPLACEMENT COUPON, AND ALLOY FOR ADDITIVE MANUFACTURING

BACKGROUND

The field of the disclosure relates to generally to component repair, and more specifically to a method of repairing a component using an additive manufacture replacement coupon.

At least some known mechanical components, such as gas turbine components including, but not limited to, turbine nozzles, turbine blade airfoils, and/or turbine blade tip shrouds, may be exposed to mechanical stresses and/or high temperatures during operation. An operational life cycle of at least some such components may be limited by creep. Creep is the tendency of a material to move slowly or deform over time when exposed to a combination of mechanical and/or thermal stresses. For example, the operational life cycle of at least some gas turbine nozzles may be limited by creep at a trailing edge of the nozzle.

At least some known components demonstrating excessive creep or other damage are replaced. However, replacement may entail complex disassembly and re-assembly of the machine, and the manufacturing costs and time required for the replacement component itself may be relatively high. Alternatively, at least some known components demonstrating excessive creep or other damage are repaired. For example, a deformed or damaged portion of the component may be repaired by a weld material build-up. However, the amount of welding required may distort the shape of the component, and the material properties, such as creep resistance, of the repaired area may not match the material properties of the original component. For another example, such components may be repaired by removing a deformed or damaged portion of the component and coupling a replacement coupon cast from the same material to the original component. However, while the cast replacement coupon facilitates matching the material properties of the original component, the replacement coupons also have a relatively high cost and time required to manufacture.

At least some known components are formed using an additive manufacturing process, in which the component is formed by successively depositing and fusing a series of thin layers of material to build the component layer by layer. However, material properties, such as creep resistance, of components built using at least some known additive manufacturing processes are limited. For a component intended for use in a high mechanical stress and/or high temperature application, a series of heat treatments of the as-built component typically is necessary, such as a stress-relieving heat treatment prior to removing the as-built component from the build plate to reduce post-build distortion of the component, followed by a hot isostatic press treatment to reduce porosity of the component material and reduce a risk of microcracking. In some cases, this is followed by another, pre-weld heat treatment if the component is to be welded. The series of heat treatments increases a cost and time required to form and use such components.

In addition, at least some known additively manufactured components intended for use in a high temperature application are formed from a cobalt-chromium-molybdenum (CoCrMo) superalloy powder that is substantially nickel-free (that is, contains less than 0.1 percent nickel content by weight), as nickel in such an alloy tends to increase a stacking fault energy of the alloy. Increased stacking fault energy is associated with adverse effects on material properties, such as but not limited to decreased creep resistance. For another example, at least some known components intended for use in a high-stress and/or high-temperature application are formed from a cobalt-chromium-molybdenum (CoCrMo) superalloy powder that has a very low iron content (that is, contains less than 0.75 percent iron content by weight), as iron in such an alloy also tends to increase a stacking fault energy of the alloy. However, material properties of at least some such alloys, such as creep resistance, remain limited.

BRIEF DESCRIPTION

In one aspect, a method for forming a secondary component from an original component having an original shape is provided. The method includes separating the original component into a parent component and a replaced portion, and forming a replacement coupon using an additive manufacturing system. The replacement coupon is shaped to substantially match the original shape of the replaced portion. The method also includes removing the replacement coupon from a build plate of the additive manufacturing system prior to application of any heat treatment to the as-built replacement coupon. The replacement coupon maintains a near-net original shape of the replaced portion after removal. The method further includes coupling the replacement coupon to the parent component to form the secondary component.

In another aspect, a method for forming a secondary component from an original component having an original shape is provided. The method includes separating the original component into a parent component and a replaced portion, and forming a replacement coupon using an additive manufacturing system. The replacement coupon is shaped to substantially match the original shape of the replaced portion. The method also includes coupling the replacement coupon to the parent component to form the secondary component, and entering the secondary component into duty with no hot isostatic press treatment of the replacement coupon having been performed.

In another aspect, a method for forming a secondary component from an original component having an original shape is provided. The method includes separating the original component into a parent component and a replaced portion, and forming a replacement coupon using an additive manufacturing system. The replacement coupon is shaped to substantially match the original shape of the replaced portion. The method also includes performing a pre-weld heat treatment of the parent component and the replacement coupon at least partially simultaneously, and coupling the replacement coupon to the parent component to form the secondary component. The pre-weld heat treatment is the sole heat treatment applied to the as-built replacement coupon prior to the coupling step.

In another aspect, an alloy in powdered form is provided. The alloy includes, by percentage weight, cobalt from about 60 percent to about 65 percent, chromium from about 25 percent to about 30 percent, molybdenum from about 5 to about 7 percent, and at least one of nickel from at least 0.1 percent and iron from at least 0.75 percent.

DETAILED DESCRIPTION

The methods, systems, and alloy compositions described herein overcome at least some disadvantages of known methods for repairing components. More specifically, the methods and systems described herein enable additive manufacture of a replacement coupon that requires no stress-relieving heat treatment prior to removal from the build plate, yet retains a near-net shape substantially free of distortion after removal. Additionally or alternatively, the methods and systems enable additive manufacture of a replacement coupon that is characterized by an as-printed porosity in a selected range that reduces a risk of micro-cracking or other deterioration of material properties, with no requirement for hot isostatic pressing (HIP) treatment of the replacement coupon. In some embodiments, the as-printed replacement coupon requires solely a single pre-weld heat treatment prior to coupling to the component to be repaired. Moreover, in some such embodiments, the pre-weld heat treatment of the replacement coupon is performed at least partially simultaneously with a stress-relieving heat treatment of the component to be repaired, further streamlining the repair process. Additionally or alternatively, the replacement coupon is additively manufactured from a CoCrMo alloy having at least one of increased nickel content and increased iron content, that imparts improved mechanical properties to the replacement coupon and the repaired component, such as, but not limited to, improved creep resistance.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
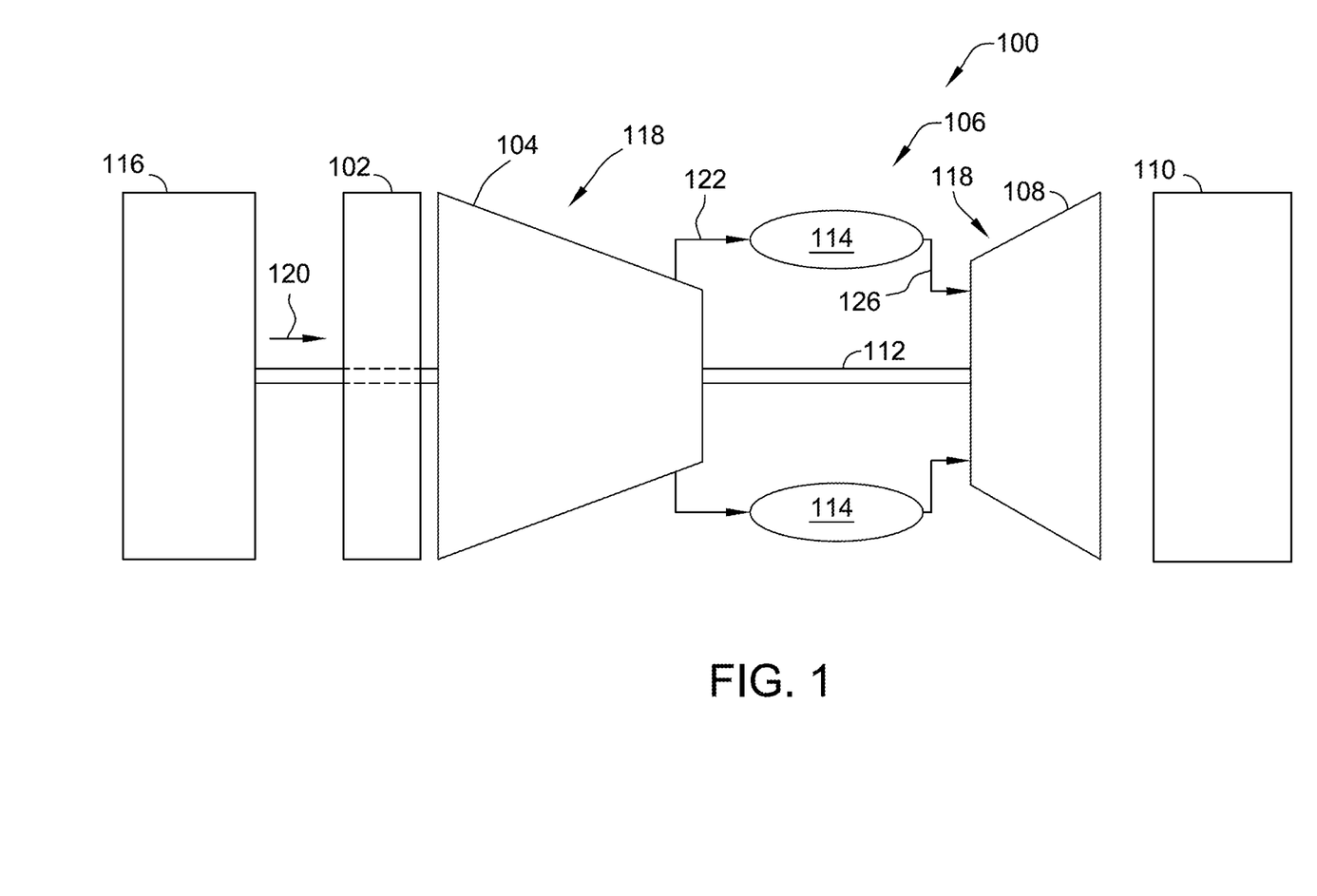
FIG. 1 is a schematic view of an exemplary rotary machine.

FIG. 1 is a schematic view of an exemplary rotary machine 100. In the exemplary embodiment, rotary machine 100 is a gas turbine engine. Alternatively, rotary machine 100 is any other rotary machine, including, without limitation, one of a steam turbine engine, a gas turbofan aircraft engine, other aircraft engine, a wind turbine, a compressor, and a pump. In some embodiments, rotary machine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. It should be noted that, as used herein, the term "couple" is not limited to a direct mechanical, electrical, and/or communication connection between components, but may also include an indirect mechanical, electrical, and/or communication connection between multiple components. Combustor section 106 includes at least one combustor 114. Combustor section 106 is coupled to compressor section 104 such that each combustor 114 is in flow communication with the compressor section 104. Turbine section 108 is further coupled to a load 116 such as, but not limited to, an electrical generator and/or a mechanical drive application. Each of compressor section 104 and turbine section 108 includes at least one rotor blade assembly 118 that is coupled to rotor shaft 112.

In operation of rotary machine 100, compressor section 104 receives intake air 120 from intake section 102, compresses the intake air, and discharges the compressed air 122 towards combustor section 106. In combustor section 106, compressed air 122 is mixed with fuel, and the resulting mixture is burned within the at least one combustor 114, generating hot gas 126 that is directed along a hot gas path through the at least one combustor 114 and turbine section 108. Turbine section 108 converts thermal energy within hot gas 126 to mechanical rotational energy that is used to drive rotor shaft 112. A portion of the rotational energy is used to drive compressor section 104, and the balance is used to drive load 116. Hot gas 126 exiting turbine section 108 is routed to exhaust section 110.

Figure 2:
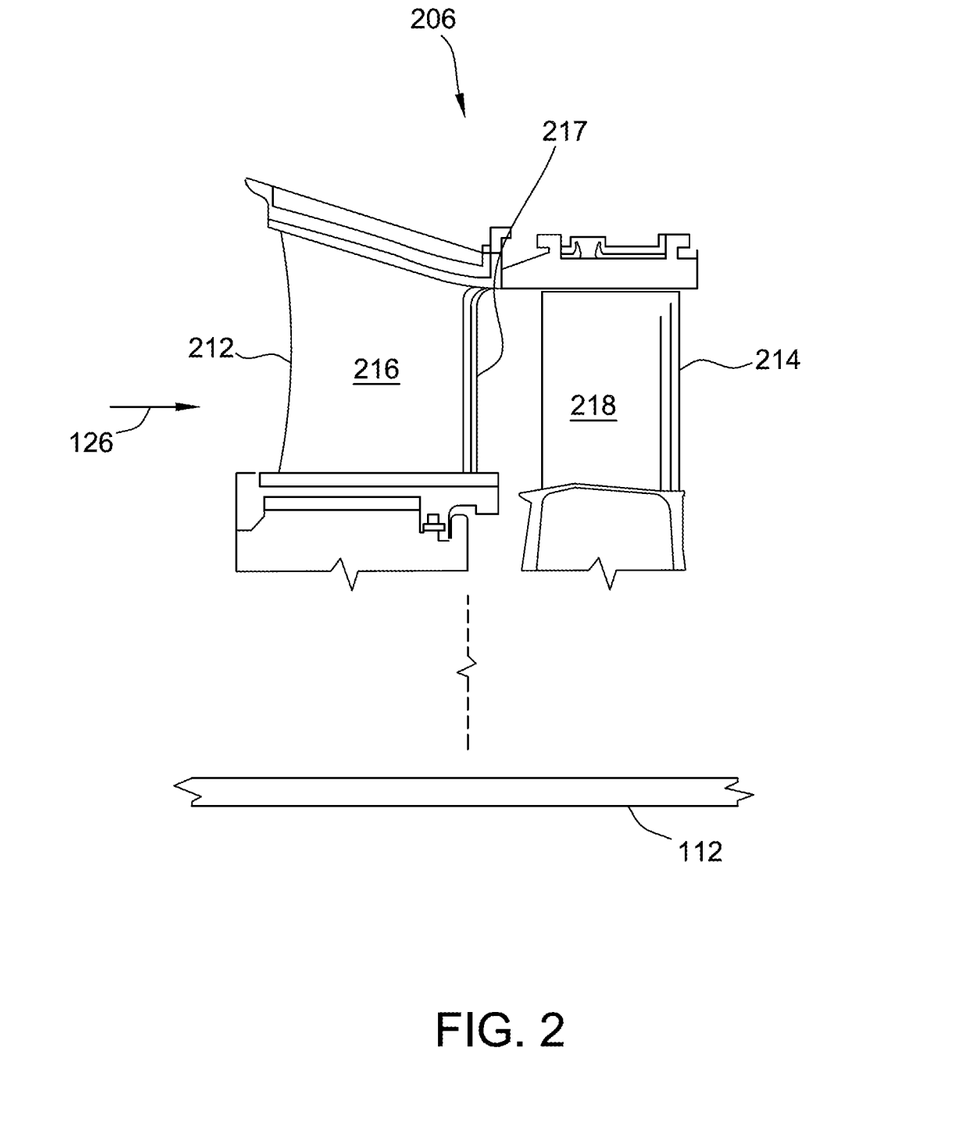
FIG. 2 is a sectional view of a stage of a turbine section that may be used with the rotary machine shown in FIG. 1.

FIG. 2 is a sectional view of a stage 206 of an exemplary turbine section 108 of rotary machine 100 (shown in FIG. 1). In some embodiments, turbine section 108 includes a plurality of stages 206. Each stage 206 includes a plurality of circumferentially spaced stationary nozzles 212, and a plurality of circumferentially spaced rotor blades 214 spaced axially downstream from nozzles 212. Each rotor blade 214 is coupled to and extends radially outward from rotor shaft 112, and each rotor blade 214 includes an airfoil 218 contoured to convert energy from the flow of hot gas 126 into rotation of shaft 112. Each nozzle 212 is coupled to and extends radially inward from a casing 228 that extends circumferentially about turbine section 108. Each nozzle 212 includes a generally airfoil-shaped vane 216. More specifically, vanes 216 are contoured to guide the flow of hot gas 126 downstream into rotor blades 214 at a preselected angle that facilitates efficient extraction of energy by rotor blades 214 from hot gas 126.

In some embodiments, over time, an environment created along the hot gas path by hot gas 126 induces creep in vane 216, or otherwise distorts or damages vane 216. For example, but not by way of limitation, a trailing edge 217 of vane 216 is distorted or partially eroded. As a result of the creep, distortion, or other damage, vane 216 no longer guides the flow of hot gas 126 downstream into rotor blades 214 at precisely the preselected angle, resulting in efficiency losses in rotary machine 100 (shown in FIG. 1). Moreover, replacement of an entirety of nozzle 212 may be cost prohibitive relative to a repair of vane 216.

Figure 3:
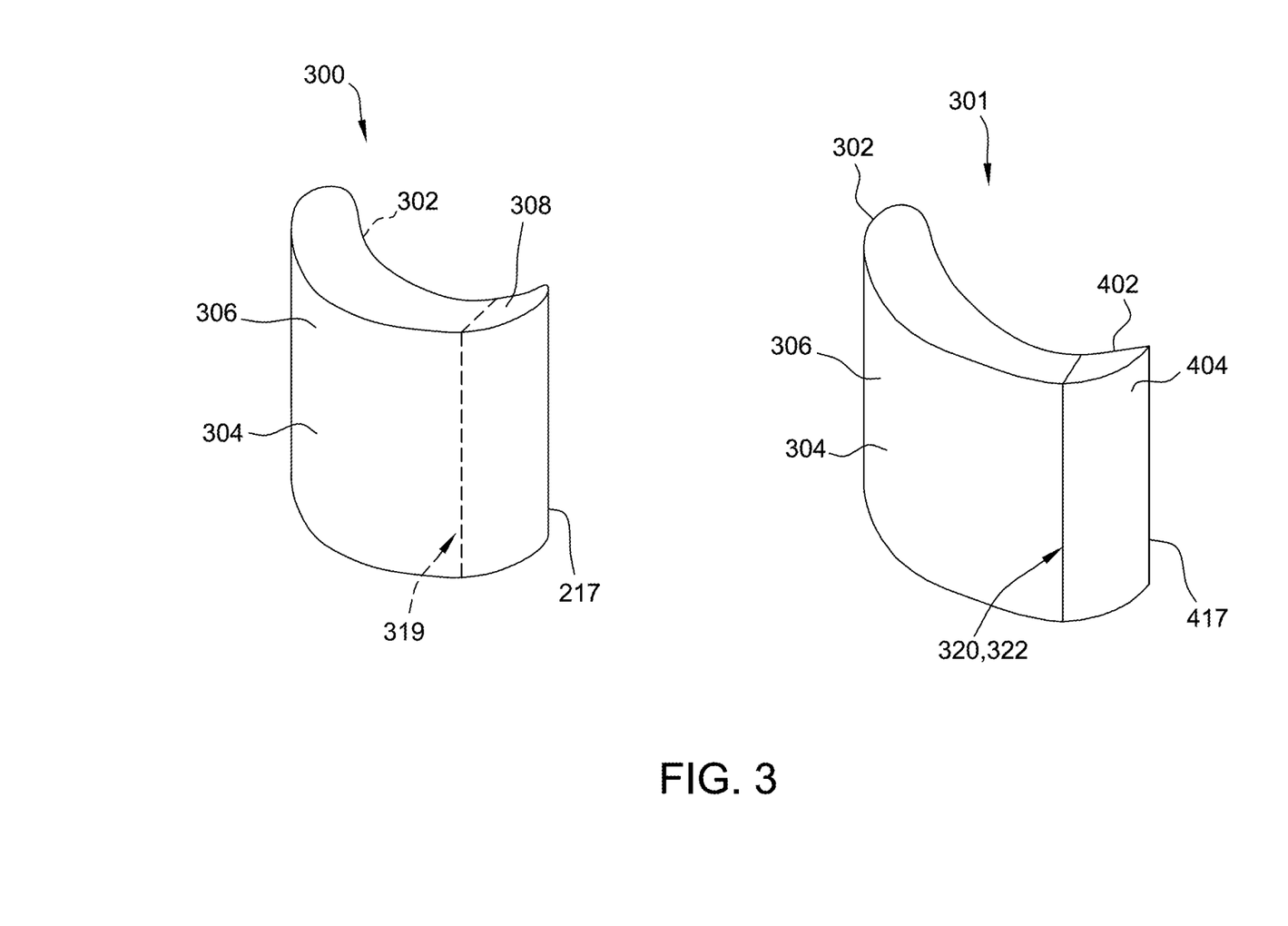
FIG. 3 is a perspective view of an exemplary original component and an exemplary secondary component that may be used with the turbine section shown in FIG. 2.

FIG. 3 is a perspective view of an exemplary original component 300 and an exemplary secondary component 301. In the exemplary embodiment, original component 300 is vane 216 of nozzle 212 (shown in FIG. 2). In alternative embodiments, original component 300 is another component that lies along the hot gas path traveled by hot gas 126 through rotary machine 100 (shown in FIG. 1). In other alternative embodiments, original component 300 is not limited to a component for use with a rotary machine, but rather original component 300 is any component, for any use or application, that may be suitably repaired as described herein. Thus, although original component 300 will be described herein in terms of, for example, a net shape of vane 216, it should be understood that the shape and other characteristics of original component 300 are not so limited.

In the exemplary embodiment, original component 300 has a unitary structure formed from a first material 304, and has an original shape defined by an outer surface 306 of original component 300. For example, original component 300 is formed by casting first material 304 in a near net original shape of original component 300, and then machining the casting to form original component 300 having the original shape. In alternative embodiments, original component 300 has any suitable structure, and is formed in any suitable fashion, that enables secondary component 301 to be formed as described herein.

Original component 300 is separable along a separation surface 319 into a parent component 302 and a replaced portion 308. For example, after a time period of operation of original component 300, replaced portion 308 demonstrates creep, distortion, or other damage that causes replaced portion 308 to deviate from the design net shape of original component 300. Original component 300 is severed along separation surface 319 to remove replaced portion 308, and to enable parent component 302 to be used to form secondary component 301. In the exemplary embodiment, separation surface 319 is approximately planar. However, in alternative embodiments, separation surface 319 has any suitable shape, configuration, and extent that facilitates repair of original component 300. For example, in the exemplary embodiment, original component 300 is vane 216, and replaced portion 308 is a portion of vane 216 that includes trailing edge 217. Although only original component 300 is shown in FIG. 3, in some embodiments, original component 300 embodied as vane 216 remains coupled to radially opposing end portions of nozzle 212 (shown in FIG. 2) during separation of replaced portion 308 and forming of secondary component 301.

Secondary component 301 is formed from parent component 302 and a replacement coupon 402, coupled together at a joint 320. Thus, in some embodiments, secondary component 301 is considered to be a repaired version of original component 300. Joint 320 is at least partially defined by a portion of parent component 302 that was adjacent to separation surface 319 in original component 300. In the exemplary embodiment, joint 320 is formed by welding replacement coupon 402 to parent component 302, for example using a weld material 322. In alternative embodiments, joint 320 is formed in any suitable fashion that enables secondary component 301 to function as described herein.

In the exemplary embodiment, replacement coupon 402 is formed from a second material 404, and is shaped to substantially match the original shape of replaced portion 308. For example, replacement coupon 402 includes a trailing edge portion 417 that is substantially identical to the original shape of trailing edge 217 of original component 300. In other words, a shape of replacement coupon 402 is a near-net original shape of replaced portion 308. In alternative embodiments, replacement coupon 402 has any suitable shape that enables secondary component 301 to function as described herein. As used herein, the term "coupon" is not intended to place any limits on the size or shape of replaced portion 308 and/or replacement coupon 402.

In addition, replacement coupon 402 is formed to have preselected material properties that enable secondary component 301 to meet or exceed a structural performance of original component 300. For example, replacement coupon 402 is formed to have a porosity in a selected range that reduces a risk of micro-cracking or other deterioration of material properties, thereby improving a resistance of replacement coupon 402 to creep.

In some embodiments, second material 404 is at least one of a cobalt-based superalloy, a nickel-based superalloy, an iron-based alloy, and a titanium-based alloy. In alternative embodiments, second material 404 is any suitable material that enables replacement coupon 402 to function as described herein.

Figure 4:
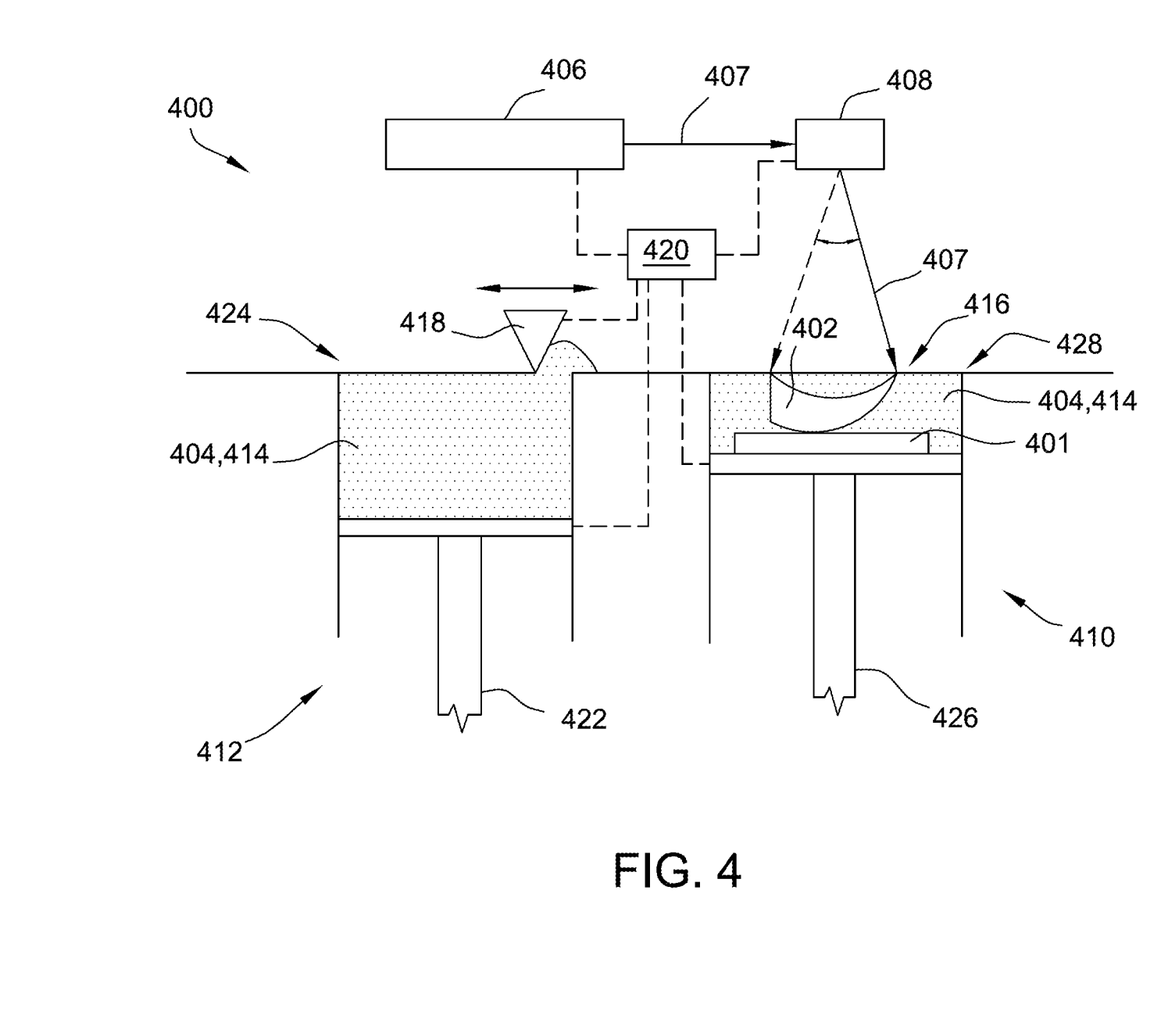
FIG. 4 is a schematic view of an exemplary additive manufacturing system.

In certain embodiments, second material 404 is a cobalt-chromium-molybdenum (CoCrMo) superalloy, initially provided in a powdered form 414 (shown in FIG. 4). For example, but not by way of limitation, second material 404 is provided in powdered form 414 having a cobalt content (by weight) in a range from about 60 percent to about 65 percent, a chromium content in a range from about 26 percent to about 30 percent, a molybdenum content in a range from about 5 percent to about 7 percent, and a silicon content, a manganese content, and a carbon content each less than 1 percent.

As discussed above, CoCrMo superalloy powders are typically substantially nickel-free (that is, contain less than 0.1 percent nickel content by weight) and/or have a very low iron content (that is, contain less than 0.75 percent iron content by weight), as higher content of nickel and iron is typically associated with increased stacking fault energy of the alloy, which generally tends to have an adverse effect on material properties such as creep resistance. However, in some embodiments of the present disclosure, second material 404 is selected to further include at least one of increased nickel content and increased iron content relative to known CoCrMo superalloy powders for additive manufacture of high temperature environment components.

For example, in some such embodiments, second material 404 provided in powdered form 414 further includes a nickel content of at least 0.1 percent, and a creep resistance of replacement coupon 402 is unexpectedly increased, as compared to a component formed from a similar CoCrMo superalloy having less than 0.1 percent nickel content. Moreover, in some such embodiments, second material 404 provided in powdered form 414 further includes an iron content in a range from about 0.01 percent to about 2 percent. Alternatively, second material 404 provided in powdered form 414 includes any suitable iron content that enables replacement coupon 402 to function as described herein.

For another example, in some such embodiments, second material 404 provided in powdered form 414 further includes an iron content of at least 0.75 percent, and a creep resistance of replacement coupon 402 is unexpectedly increased as compared to a component formed from a similar CoCrMo superalloy having less than 0.75 percent iron content. Moreover, in some such embodiments, second material 404 provided in powdered form 414 further includes a nickel content in a range of from about 0.01 percent to about 1 percent. Alternatively, second material 404 provided in powdered form 414 includes any suitable nickel content that enables replacement coupon 402 to function as described herein.

Additionally, in some such embodiments, second material 404 provided in powdered form 414 including both a nickel content of at least 0.1 percent and an iron content of at least 0.75 percent increases a creep resistance of replacement coupon 402 as compared to a component having only one of increased nickel and iron content. In a particular embodiment, second material 404 further including a nickel content in a range from 0.1 percent to about 0.15 percent and an iron content in a range from about 1 percent to about 1.2 percent particularly increases a creep resistance of replacement coupon 402.

Additionally, in some such embodiments, second material 404 having at least one of increased nickel content and increased iron content, as described above, further includes a molybdenum content of at least 6 percent, and a creep resistance of replacement coupon 402 is increased as compared to a component formed from a similar CoCrMo superalloy having less than 6 percent molybdenum content. Moreover, in some such embodiments, second material 404 provided in powdered form 414 as a CoCrMo superalloy having at least one of increased nickel content and increased iron content, as described above, and further having a molybdenum content of at least 6.4 percent particularly improves a creep resistance of replacement coupon 402.

Although the advantages of increased nickel, iron, and/or molybdenum content are described above in terms of increased creep resistance, it should be understood that, in some embodiments, the advantages are demonstrated for other material properties as well, such as, but not limited to, tensile strength and fatigue resistance. In alternative embodiments, second material 404 provided in powdered form 414 includes any suitable nickel, iron, and/or molybdenum content that enables replacement coupon 402 to function as described herein. More specifically, in the exemplary embodiment, replacement coupon 402 is formed via an additive manufacturing system, such as the exemplary embodiment of an additive manufacturing system 400 shown schematically in FIG. 4, and certain operating parameters of the additive manufacturing system are tuned to selectively improve material characteristics of replacement coupon 402, as will be described herein.

With reference to FIG. 4, in the exemplary embodiment, additive manufacturing system 400 is a Direct Metal Laser Sintering (DMLS) system. In alternative embodiments, additive manufacturing system 400 is any other suitable additive manufacturing system, including, without limitation, one of a Direct Metal Laser Melting (DMLM) system, a Selective Laser Sintering (SLS) system, a Direct Metal Laser Deposition (DMLD) system, a Direct Metal Laser Deposition (DMLD) system, and a LasergCusing system. In the exemplary embodiment, additive manufacturing system 400 includes a build fixture 410, a build plate 401 oriented within build fixture 410 and configured to support replacement coupon 402, a laser system 406 configured to generate an energy beam 407, a scanner system 408 configured to selectively direct energy beam 407 across build fixture 410 at a preselected scan speed, a powder delivery system 412, a powder coater 418, and a controller 420.

In the exemplary embodiment, powder coater 418 is movable, upon instruction by controller 420, to transfer second material 404 in powdered form 414 from powder delivery system 412 to build fixture 410. For example, powder delivery system 412 includes a piston 422 operable, upon instruction by controller 420, to raise a selected thickness of second material 404 in powdered form 414 above an edge 424 of powder delivery system 412, and powder coater 418 is sweepable along edge 424 to capture the selected thickness of second material 404 in powdered form 414 and deliver it to build fixture 410. Powder coater 418 is further operable to deposit the captured second material 404 in powdered form 414 atop build fixture 410 as a build layer 416. Moreover, build fixture 410 is operable, upon instruction by controller 420, to reposition build plate 401 to receive build layer 416 atop previously deposited layers of second material 404. For example, build fixture 410 includes a piston 426 operable, upon instruction by controller 420, to lower build plate 401 a preselected distance below an edge 428 of build fixture 410 to accommodate receipt of build layer 416 from powder coater 418. In alternative embodiments, additive manufacturing system 400 is configured to deposit second material 404 in powdered form 414 onto build layer 416 in any suitable fashion that enables replacement coupon 402 to be formed as described herein.

In the exemplary embodiment, laser system 406 is configured, upon instruction by controller 420, to generate energy beam 407 having a preselected energy sufficient to at least partially melt second material 404 in powdered form 414 at preselected regions of build layer 416, such that the preselected regions fuse with second material 404 in a layer immediately below build layer 416. In the exemplary embodiment, laser system 406 includes a yttrium-based solid state laser. In alternative embodiments, laser system 406 includes any suitable source for energy beam 407 that enables replacement coupon 402 to be formed as described herein. Additionally, although additive manufacturing system 400 is described as including a single laser system 406, it should be understood that additive manufacturing system 400 may include more than one laser system 406. In some embodiments, for example, additive manufacturing system 400 includes a first laser system 406 having a first power and a second laser system 406 having a second power different from the first power. In other embodiments, additive manufacturing system 400 includes any combination of laser systems 406 each having any suitable power that enables replacement coupon 402 to be formed as described herein.

In the exemplary embodiment, scanner system 408 is configured, upon instruction by controller 420, to selectively direct energy beam 407 to preselected regions of build layer 416 that correspond to portions of replacement coupon 402, such that the preselected regions fuse with second material 404 in a layer immediately below build layer 416. For example, scanner system 408 includes a suitable sensor, such as at least one of a two-dimension (2D) scan galvanometer, a three-dimension (3D) scan galvanometer, and a dynamic focusing scan galvanometer (not shown), to determine a position and orientation of build layer 416 with respect to energy beam 407. In alternative embodiments, scanner system 408 is configured to selectively direct energy beam 407 to the preselected regions of build layer 416 in any suitable fashion that enables additive manufacturing system 400 to function as described herein.

Controller 420 is operably coupled to each of build fixture 410, laser system 406, scanner system 408, powder delivery system 412, and powder coater 418 to implement additive manufacturing system 400 as a computer numerically controlled (CNC) machine. In the exemplary embodiment, to form replacement coupon 402, controller 420 receives a computer design model of replacement coupon 402 and generates a build file in which the computer design model is "sliced" into a series of thin, parallel planes, such that a distribution of second material 404 within each plane is defined. Controller 420 then provides command signals to, and receives feedback from, build fixture 410, laser system 406, scanner system 408, powder delivery system 412, and powder coater 418 as necessary to deposit and fuse successive layers of second material 404 in accordance with the model slices to form replacement coupon 402. For example, controller 420 is configured to control build fixture 410, powder delivery system 412, and powder coater 418 to provide second material 404 in powdered form 414 for each successive build layer 416, and to control the power output of laser system 406 and the position, movement, and scan speed of scanner system 408, such that energy beam 407 follows a predetermined path along each build layer 416, such that second material 404 is selectively fused to form each layer of replacement coupon 402 having a fused layer thickness in accordance with the build file.

In the exemplary embodiment, controller 420 is implemented using one or more electronic computing devices. Such devices typically include at least one processing device (not shown) such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a non-transitory storage device and/or a memory device coupled to the at least one processor. Such instructions, when executed by the controller or processing device, cause the controller or processing device to perform at least some of the method steps described herein. Although controller 420 is illustrated as a discrete system, controller 420 may be implemented at least partially by at least one processor embedded within any of build fixture 410, laser system 406, scanner system 408, powder delivery system 412, and powder coater 418, and any other suitable computing devices. The above examples are exemplary only, and thus are not intended to limit in any way the definition and/or meaning of the terms controller and processing device.

As noted above, material properties of components built using typical additive manufacturing processes may be limited. In particular, components intended for use in a high-stress and/or high-temperature application typically require a series of different types of heat treatments of the as-built component, for example a stress-relieving heat treatment prior to removing the as-built repair component from the build plate to reduce post-build distortion of the component, followed by a hot isostatic press treatment to reduce porosity of the component material and reduce a risk of micro-cracking A hot isostatic press treatment refers to application of an elevated temperature and pressure, such as in a high pressure containment vessel filled with an inert gas, such that elevated pressure is applied to the component from all directions. This is typically followed by another pre-weld heat treatment if the component is to be welded. However, in some embodiments, additive manufacturing system 400 as described herein is configured to produce an as-built replacement coupon 402 with improved mechanical properties, such that replacement coupon 402 requires only a reduced number of heat treatments, such as one stress-relief heat treatment that can be performed after removal from build plate 401, prior to entering duty as part of secondary component 301.

For example, in certain embodiments, for additive manufacture of replacement coupon 402 using additive manufacturing system 400, controller 420 is configured to operate at least laser system 406 and scanner system 408 using preselected operating parameters that result in reduced residual stress in as-built replacement coupon 402. The reduced residual stress enables replacement coupon 402 to be removed from build plate 401, prior to any heat treatment, such that replacement coupon 402 retains its as-built shape after removal from build plate 401. In other words, the preselected operating parameters enable replacement coupon 402 to be removed from build plate 401, prior to any heat treatment, with little to no resulting distortion of replacement coupon 402, as compared to builds using typical operating parameters.

Additionally or alternatively, controller 420 is configured to operate at least laser system 406 and scanner system 408 using preselected operating parameters that result in reduced porosity in as-built replacement coupon 402, as compared to builds using typical operating parameters. The term "porosity" refers to a measure of void spaces in a material. For example, it is expressed as a fraction between 0 and 1, or as a percentage between 0 and 100 percent, of the volume of voids in replacement coupon 402 over the total volume of replacement coupon 402. In some embodiments, the reduced porosity results in as-built replacement coupon 402 having a reduced risk of micro-cracking without undergoing a hot isostatic press treatment, as compared to builds using typical operating parameters. Thus, as-built replacement coupon 402 with no hot isostatic press treatment is capable of duty as part of secondary component 301, having improved creep resistance as compared to builds using typical operating parameters.

For example, second material 404 provided in powdered form 414 includes a suitable nickel and/or iron content as described above, and the preselected operating parameters include a power of energy beam 407 generated by laser system 406 in a range from about 100 watts to about 2,000 watts, and a scan speed of scanner system 408 in a range of from about 50 millimeters per second to about 2,000 millimeters per second, such that a thickness of each fused build layer 416 of replacement coupon 402 is in a range from about 10 micrometers to about 1,000 micrometers. In some such embodiments, the preselected operating parameters within the above-cited ranges result in reduced residual stress in as-built replacement coupon 402 that enables replacement coupon 402 to be removed from build plate 401, prior to any heat treatment, such that replacement coupon 402 retains its as-built shape after removal from build plate 401. Moreover, in some such embodiments, the preselected operating parameters within the above-cited ranges result in reduced porosity such that replacement coupon 402 enters duty as part of secondary component 301 without undergoing a hot isostatic press treatment. For example, in some such embodiments, as-built replacement coupon 402 has a porosity less than about 0.35 percent with no hot isostatic press treatment of the replacement coupon having been performed. The elimination of a stress-relieving heat treatment prior to removal from build plate 401, and/or the elimination of a hot isostatic press treatment, reduces a time and cost required to form replacement coupon 402 ready for coupling to secondary component 301, as compared to builds using typical operating parameters.

Additionally, in some such embodiments, the preselected operating parameters include a power of energy beam 407 generated by laser system 406 in a range from about 280 watts to about 300 watts, and a scan speed of scanner system 408 in a range of from about 800 millimeters per second to about 1,000 millimeters per second, such that a thickness of each fused build layer 416 of replacement coupon 402 is in a range from about 40 micrometers to about 50 micrometers. In some such embodiments, the preselected operating parameters within the above-cited ranges result in a particularly advantageously reduced residual stress in as-built replacement coupon 402, and a porosity less than about 0.15 percent without undergoing a hot isostatic press treatment.

In certain embodiments, as-built replacement coupon 402 is subjected to no heat treatments, except for a pre-weld heat treatment prior to coupling to parent component 302 (shown in FIG. 3) at joint 320 via welding. Moreover, in some such embodiments, the pre-weld heat treatment of replacement coupon 402 is conducted at least partially simultaneously with a pre-weld heat treatment of parent component 302, further reducing a time and cost required to form secondary component 301 using replacement coupon 402.

Figure 5:
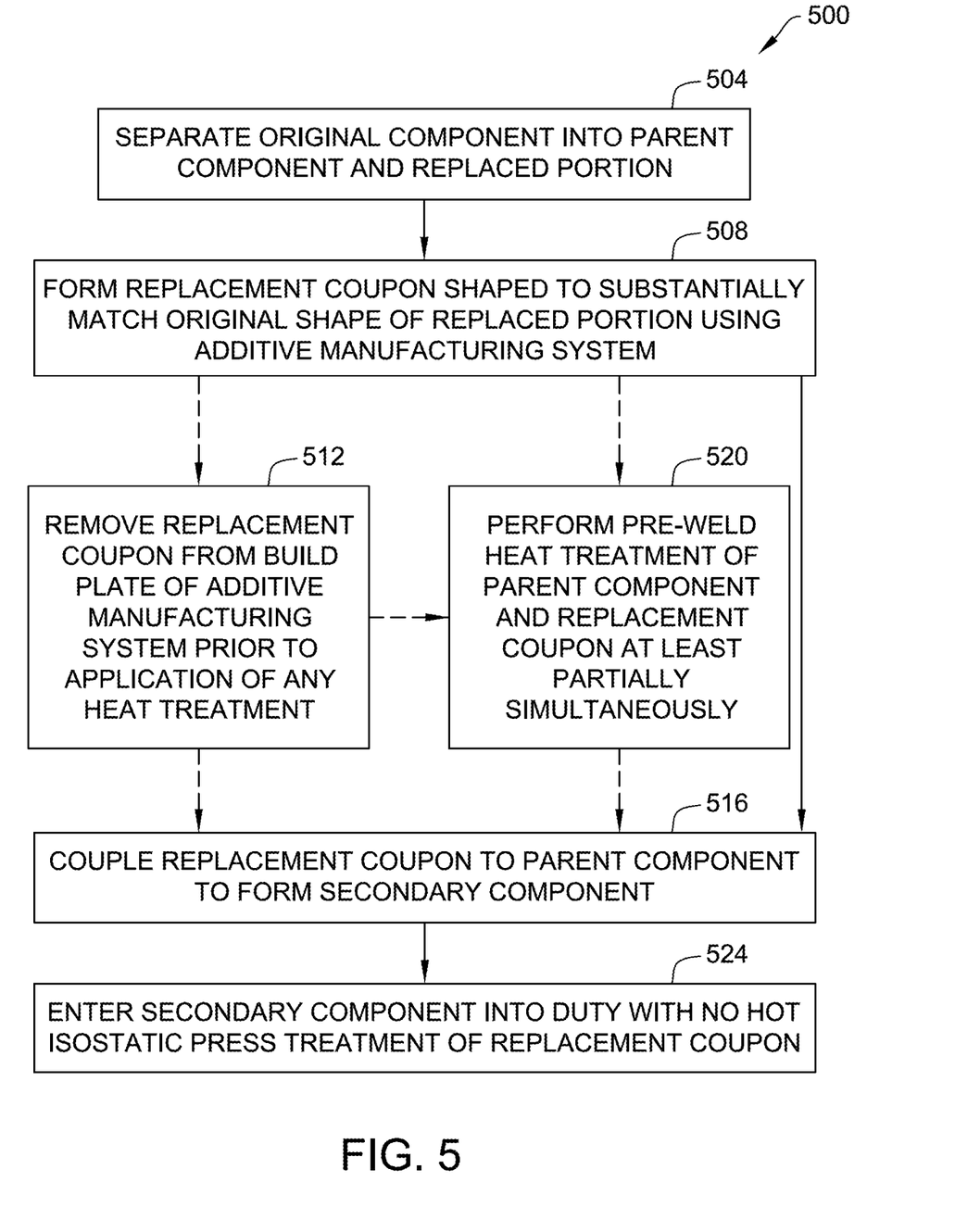
FIG. 5 is a flow diagram of a method for forming a secondary component, such as the secondary component shown in FIG. 3, from an original component, such as the original component shown in FIG. 3

FIG. 5 is a flow diagram of a method 500 for forming a secondary component, such as secondary component 301, from an original component having an original shape, such as original component 300. With reference also to FIGS. 3 and 4, in the exemplary embodiment, method 500 includes separating 504 the original component into a parent component and a replaced portion, such as parent component 302 and replaced portion 308. Method 500 further includes forming 508 a replacement coupon, such as replacement coupon 402, shaped to substantially match the original shape of the replaced portion using an additive manufacturing system, such as additive manufacturing system 400. In some embodiments, method 500 includes removing 512 the replacement coupon from a build plate of the additive manufacturing system, such as build plate 401, prior to application of any heat treatment to the as-built replacement coupon, wherein the replacement coupon maintains a near-net original shape of the replaced portion after removal. For example, the replacement coupon is removed from the build plate with no prior stress-relieving heat treatment and substantially maintains its as-built shape, as described above.

In the exemplary embodiment, method 500 further includes coupling 516 the replacement coupon to the parent component to form the secondary component. In some embodiments, method 500 additionally includes entering 524 the secondary component into duty with no hot isostatic press treatment of the replacement coupon having been performed. Additionally or alternatively, in certain embodiments, the step of coupling 516 the replacement coupon to the parent component includes welding, and method 500 further includes performing 520 a pre-weld heat treatment of the parent component and the replacement coupon at least partially simultaneously, wherein the pre-weld heat treatment is the sole heat treatment applied to the as-built replacement coupon prior to coupling step 516. Moreover, in some such embodiments, the pre-weld heat treatment is the sole heat treatment applied to the as-built replacement coupon prior to entry into duty at step 520.

In some embodiments, replacement coupon 402 formed using a CoCrMo superalloy for second material 404 and/or formed by additive manufacturing system 400 using preselected operating parameters has improved material properties as compared to original component 300. For example, in the exemplary embodiment, secondary component 301 including replacement coupon 402 has increased creep resistance adjacent to the trailing edge, as compared to original component 300 including replaced portion 308, such that secondary component 301 has superior overall lifetime performance as compared to original component 300.

EXAMPLE

The Example presented here is illustrative of the methods and compositions disclosed herein and is not meant to be limiting in any respect.

A series of test coupons was formed using embodiments of additive manufacturing system 400 from respective CoCrMo superalloy compositions provided in powdered form. More specifically, a first group of test coupons was formed from a known CoCrMo superalloy having a standard composition, including nickel content less than 0.1 percent, iron content less than 0.75 percent, and molybdenum content less than 6.0 percent. A second group of test coupons was formed from second material 404 according to an embodiment of the current disclosure, including nickel content of at least 0.1 percent, iron content of at least 0.75 percent, and molybdenum content of at least 6 percent. Table 1 further details the alloy composition of the two groups of test coupons, as determined via inductively coupled plasma atomic emission spectroscopy.

TABLE 1

| Alloy Composition | | |
|---|---|---|
| Element | Test coupon group #1 (standard composition) | Test coupon group #2 (composition according to the disclosure) |
| Co | 63.5 | 62.5 |
| Cr | 29.33 | 27.66 |
| Mo | 5.7 | 6.42 |
| C | 0.2 | 0.18 |
| Si | 0.5 | 0.56 |
| Mn | 0.55 | 0.75 |
| Ni | 0.025 | 0.1 |
| Fe | 0.01 | 1.12 |

Trailing edge portions of vanes 216 of multiple nozzles 212 (shown in FIG. 2) were severed and replaced by test coupons from groups 1 and 2, creating "repaired" components similar to the illustration in FIG. 3. The original vanes were cast from a cobalt-based superalloy including about 51 percent cobalt, about 30 percent chromium, about 10 percent nickel, about 7 percent tungsten, about 0.8 percent each of silicon and manganese, and about 0.3 percent carbon. Test coupons from each group, and "repaired" components including test coupons from each group, were subjected to a number of material property tests using methods and techniques as are known in the art. Notably, the test coupons in groups 1 and 2 were not subjected to hot isostatic pressing prior to the tests described below.

More specifically, "repaired" components having test coupons from each group were subjected to a stress of 7,000 pounds per square inch and a temperature of 1,700° F. for an extended period of time, and the amount of creep in each test coupon was measured at multiple time intervals. Test coupons in group 1 reached 1 percent creep in about 120 hours, while test coupons in group 2 reached 1 percent creep after about 390 hours.

In addition, test coupons from each group were subjected to tensile testing at a temperature of 1,700° F. Test coupons in group 1 reached 0.2 percent plastic strain (0.2 percent yield strength) at about 22,000 pounds per square inch, while test coupons in group 2 demonstrated a 0.2 percent yield strength of about 30,000 pounds per square inch. Additionally, test coupons in group 1 demonstrated an ultimate tensile strength of about 31,000 pounds per square inch, while test coupons in group 2 demonstrated an ultimate tensile strength of about 39,000 pounds per square inch.

Similarly, "repaired" components having test coupons from each group were subjected to tensile testing at room temperature. Test coupons in group 1 demonstrated a 0.2 percent yield strength of about 60,000 pounds per square inch, while "repaired" components having test coupons in group 2 failed within the cast parent component before results could be obtained for the test coupons.

The above-described embodiments overcome at least some disadvantages of known methods for repairing components. Specifically, the embodiments provide operating parameters of an additive manufacture system, and/or components of an alloy in powdered form used to build the component, that facilitate tailoring a microstructure of an additively manufactured component to produce a component having a near net shape and desired material properties, faster and at lower cost as compared to previously known methods. For example, some embodiments enable additive manufacture of a replacement coupon that requires no stress-relieving heat treatment prior to removal from the build plate, yet retains a near-net shape substantially free of distortion after removal. Additionally or alternatively, the embodiments enable additive manufacture of a replacement coupon that is characterized by an as-printed porosity in a selected range that reduces a risk of micro-cracking or other deterioration of material properties, with no requirement for hot isostatic pressing treatment of the replacement coupon. Additionally or alternatively, the as-printed replacement coupon requires solely a single pre-weld heat treatment prior to coupling to the component to be repaired. Additionally or alternatively, the pre-weld heat treatment of the replacement coupon is performed at least partially simultaneously with a stress-relieving heat treatment of the component to be repaired, further streamlining the repair process. Additionally or alternatively, the replacement coupon is additively manufactured from a CoCrMo alloy having at least one of increased nickel content and increased iron content, that imparts improved mechanical properties to the replacement coupon and the secondary component formed therefrom, such as, but not limited to, improved creep resistance.

The methods, systems, and compositions disclosed herein are not limited to the specific embodiments described herein, but rather, steps of the methods, elements of the systems, and/or elements of the compositions may be utilized independently and separately from other steps and/or elements described herein. For example, the methods, systems, and compositions are not limited to practice with only a rotary machine as described herein. Rather, the methods, systems, and compositions may be implemented and utilized in connection with many other applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for forming a secondary component from an original component having an original shape, said method comprising:
   separating the original component into a parent component and a replaced portion;
   forming a replacement coupon using an additive manufacturing system, the replacement coupon shaped to substantially match the original shape of the replaced portion;
   removing the replacement coupon from a build plate of the additive manufacturing system prior to application of any heat treatment to the as-built replacement coupon, wherein the replacement coupon maintains a near-net original shape of the replaced portion after removal;
   performing a pre-weld heat treatment of the parent component and the replacement coupon at least partially simultaneously, wherein the pre-weld heat treatment is the sole heat treatment applied to the as-built replacement coupon prior to said coupling; and
   coupling the replacement coupon to the parent component to form the secondary component, wherein said forming comprises forming the replacement coupon from an alloy in powdered form, wherein the alloy consists of, by percentage weight:
   cobalt from about 60 percent to about 65 percent;
   chromium from about 25 percent to about 30 percent;
   molybdenum from about 5 percent to about 7 percent;
   carbon less than about 1.0 percent;
   silicon less than about 1.0 percent;
   manganese less than about 1.0 percent;
   nickel from 0.1 percent to about 1 percent; and
   iron from about 1 percent to about 2 percent.

2. The method according to claim 1, further comprising operating the additive manufacturing system such that a thickness of each fused build layer of the replacement coupon is in a range from about 10 micrometers to about 1,000 micrometers.

3. The method according to claim 2, further comprising operating the additive manufacturing system at a laser system power in a range from about 100 watts to about 2,000 watts.

4. The method according to claim 2, further comprising operating the additive manufacturing system at a scan speed in a range of from about 50 millimeters per second to about 2,000 millimeters per second.

5. The method according to claim 1, further comprising entering the secondary component into duty with no hot isostatic press treatment of the replacement coupon having been performed.

6. The method according to claim 5, wherein said forming comprises forming the replacement coupon having a porosity less than about 0.35 percent with no hot isostatic press treatment of the replacement coupon having been performed.

7. The method according to claim 1, wherein the alloy further includes, by percentage weight,
nickel from 0.2 percent to about 1 percent iron.

8. The method according to claim 7, wherein the alloy further includes, by percentage weight, nickel about 0.2 percent and iron about 1.12 percent.

* * * * *

UNITED STATES PATENT AND TRADEMARK OFFICE
CERTIFICATE OF CORRECTION

PATENT NO. : 11,224,915 B2
APPLICATION NO. : 15/970101
DATED : January 18, 2022
INVENTOR(S) : Srinivasan et al.

Page 1 of 1

It is certified that error appears in the above-identified patent and that said Letters Patent is hereby corrected as shown below:

In the Claims

Column 15, Line 1, In Claim 7, it reads "The method according to claim 1, wherein the alloy further includes, by percentage weight, nickel from 0.2 percent to about 1 percent iron" but it should be "...nickel from 0.2 percent to about 1 percent."

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*